(12) United States Patent
Bonko

(10) Patent No.: US 6,386,652 B1
(45) Date of Patent: May 14, 2002

(54) PNEUMATIC DRIVER TIRE FOR TRACKED VEHICLE

(75) Inventor: Mark Leonard Bonko, Northwest, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/762,385
(22) PCT Filed: Sep. 2, 1998
(86) PCT No.: PCT/US98/18131
  § 371 Date: Feb. 5, 2001
  § 102(e) Date: Feb. 5, 2001
(87) PCT Pub. No.: WO00/13921
  PCT Pub. Date: Mar. 16, 2000
(51) Int. Cl.[7] .............................. B60S 1/62; B60C 11/03
(52) U.S. Cl. .................................. 305/115; 152/209.13
(58) Field of Search .............................. 305/115, 111, 305/112; 152/209.12, 209.13, 209.1, 900

(56) References Cited

U.S. PATENT DOCUMENTS

| | | | | |
|---|---|---|---|---|
| D168,675 S | * | 1/1953 | Custer | 152/209.12 |
| 2,626,649 A | * | 1/1953 | Eiler et al. | 152/209.12 |
| 3,155,436 A | * | 11/1964 | Bonmartini | 305/111 |
| 3,457,981 A | | 7/1969 | Verdier | 152/209 |
| 3,844,326 A | * | 10/1974 | Verdier | 152/209.12 |
| 3,939,890 A | | 2/1976 | Abe | 152/209 B |
| 4,574,857 A | * | 3/1986 | Beeghly et al. | 152/209.12 |
| 4,687,261 A | * | 8/1987 | Atkin | 305/111 |
| 4,881,586 A | * | 11/1989 | Shinomiya | 152/209.12 |
| 5,279,378 A | | 1/1994 | Grawey et al. | 180/9.21 |
| 5,363,936 A | * | 11/1994 | Grawey et al. | 305/111 |
| 6,209,602 B1 | * | 4/2001 | Bonko | 152/209.12 |
| 6,263,933 B1 | * | 7/2001 | Baus | 152/209.12 |

FOREIGN PATENT DOCUMENTS

| | | | | |
|---|---|---|---|---|
| DK | 1009954 | | 6/1957 | B62G/19/01 |
| WO | 92833669 | | 8/1998 | B60C/11/11 |

* cited by examiner

Primary Examiner—S. Joseph Morano
Assistant Examiner—Long Bae Nguyen
(74) Attorney, Agent, or Firm—David L King

(57) ABSTRACT

A pneumatic driver tire (10) for tracked vehicles (1) has a carcass reinforcing structure (30) having two or more bias angled plies (32, 34), the cords of the first ply (32) being oppositely oriented relative to the cords of the second ply (34). The tire (10) has no integral belts on breakers and preferably has an aspect ratio of about 100 %. The tire (10) has a tread (12) with voids (70) that extend across the entire tread (12) creating soil discharge channels (70). Preferably the tire tread (12) has a central area (66) exhibiting a high net contact area and axially outer areas (60, 62) having lower net contact areas. The tread lugs (40) also have a radiused portion (48) designed to limit the tires sidewalls (16) from contacting the track.

7 Claims, 6 Drawing Sheets

PNEUMATIC DRIVER TIRE FOR TRACKED VEHICLE

TECHNICAL FIELD

The present invention relates to tracked vehicles for agricultural vehicles and the like, more particularly a pneumatic drive tire and wheel for such tracked vehicles.

BACKGROUND OF THE INVENTION

The use of pneumatic tires on agricultural vehicles dominates the agricultural industry as it is known today.

Nevertheless, there is an increasing use of track vehicles for agricultural use. These track vehicles use an endless belt, preferably made of elastomeric material reinforced by cords of steel. The belt has a ground engaging tread surface similar to that found on a tire. The primary benefit to a track system is clearly the increase flotation tracks have over tires. Tracks can bridge a longer surface area, helping to keep the vehicle afloat. In many agricultural applications the use of tracked vehicles is becoming ever increasingly more popular.

In a prior art patent, U.S. Pat. No. 5,279,378 to Charles E. Grawey, et al. a frictionally driven belted work vehicle is disclosed. In that application Grawey discloses the use of a metal-coated wheel assembly having a pair of rigid wheels with a rubber coating as a drive wheel. Also a cushion wheel can be used as a drive wheel and in an alternative embodiment a bias belted pneumatic tire is used in pairs to provide a drive wheel for the belted vehicle. In that application, Grawey et al. advises that the metal or cushioned wheels are preferred over the pneumatic wheels for a variety of reasons. Grawey notes that panagraphing and relative motion between the drive wheel and the belt can not be tolerated and still provide reasonable wear. He further notes that other than the well-known panagraphing which all bias tires experience, bias tires when under load also exhibit a tracing out of the footprint for one revolution thereof which is shorter by approximately 2 or 3% than the circumference around such tires outer periphery when unloaded. Such circumferential changing phenomena causes relative motion between the belt interior surface and the drive wheel tread portions. Such motion results in wear of the leading edge of the tread lugs and, thus, reduces the tractive length of their drive portions. The practical effect of such wearing substantially reduces the wiping action of the tread lugs upon the surface of the belt which in turn reduces the friction coupling between the drive wheel structure and the belt when they are operated in mud or other adverse friction coefficient reducing requirements. Such relative bias wheel to belt movement carrying frictional engagement results in wear of the belt and the tire. The inventor then goes on to note that the lack of relative movement between the track or belt and a cushioned or rigid wheel structure greatly reduces these wear problems.

While the rigid wheels and semi-cushioned or cushioned wheels dramatically reduce the wear problems it is well-known that the vehicle suspension system must be greatly enhanced in order to provide any ride comfort. This dramatically increases the cost of the vehicle and overall the cost of operating a track vehicle system.

It is an object to the present invention to provide a pneumatic wheel that does not exhibit unusual mud packing characteristics.

It is a further object of the invention that the pneumatic wheel can be used which can accommodate debris and wet soil conditions while still maintain frictional engagement with the belt itself so that forward or reverse propulsion of the vehicle is not dramatically reduced due to a wet or muddy soil condition.

It is a further object of the invention to provide a pneumatic tire in the drive wheel position that has improved traction characteristics in the tread area to minimize any slippage.

SUMMARY OF THE INVENTION

The present invention relates to a pneumatic drive tire (10) for track vehicles. The tire (10) has a carcass reinforcing structure (30) having two or more bias angled plies (32, 34). The cords of the first ply (32) are oppositely oriented relative to the cords of the second ply (34). Preferably the tire (10) has no belts or breakers and preferably has an aspect ratio of 100%. The tire (10) has tread (12) with voids that extend across the entire tread creating soil discharge channels (70). Preferably the tire tread (12) has a central area (66) exhibiting high contact area and axially outer areas (60, 62) having a lower contact area. The tread lugs (40) also have a radius portion (48) designed to limit the tire sidewalls (16) from contacting the track (2).

Each tire (10) has a pair of annular beads (24), a carcass reinforcing structure (30) extending radially outward from bead (24) to bead (24), an elastomeric sidewall (16) extending radially outward from each bead (24) adjacent the carcass reinforcing structure (30) to a radially outer tread (12). The tread (12) is characterized by an inner tread surface (14), a plurality of lugs (40) extending radially outward from the inner tread (14) a distance (h). The lugs (40) are divided into a first row and a second row. The first row extends from the sidewall (16) toward the center plane of the tread. The second row extends from the opposite sidewall toward the center plane of the tread (12). The lugs (40) from the first row are circumferentially offset and similar in shape but oppositely oriented relative to the lugs (40) of the second row. Each lug (40) has an enlarged axially inner end (46). A shallow circumferentially continuous central rib (50) extends radially outward from the inner tread (14) a distance of less than half (h). A combination of lugs (40), inner tread (14) and a shallow central continuous rib (50) are spaced to create voids of continuous soil discharge channels (70) extending across the tread (12) from sidewall (16) to opposite sidewall (16).

The tread (12) is divided into three parts (60, 62, 66). A first axially outer portion (60) being ⅙ of the tread width. A second axially outer portion (62) being ⅙ of the tread width and a central portion (66) of ⅔ of the tread width. Each portion (60, 62, 66) has a net contact area measured around the circumference of the tire (10). The contact area of the first tire portion (60) and the second portion (62) is less than 60% of the gross circumferential area of the respective portion. The central portion (66) has a net contact area about 60%. In the preferred embodiment the outer portions (60, 62) had a net contact area 52% while the net contact area of the central portion was approximately 60%.

In a preferred embodiment tire (10) each lug (40) has an axially outer surface (42) tangent to a sidewall (16) extending generally radially outwardly therefrom, the radially outer surface (44) of circumferentially adjacent lugs (40) are spaced by the soil discharge channel (70) preferably the radially outer surface (44) joins the axially outer surface (42) at a radius portion (48). The radius portion (48) is less than the radius of the central guide of the track thereby minimizing the contact of the axially outer portion (42) of the lug (40) and sidewall (16) with the track (2).

In the preferred embodiment tire (10) the lugs (40) extend radially from the central rib (50) a distance of less than half of an inch (2 cm), the central rib (50) extends outwardly less than a quarter of an inch (1 cm), the total distance (h) being less than 0.75 inches (3 cm). The lugs (40) each have a centerline (41) as measured between the leading edges (43) and the trailing edges (45) of the respective lug. The centerline (41) being about 90° relative of the circumferential direction.

BRIEF DESCRIPTION OF THE DRAWINGS

The advantages of the present invention will be apparent from the following description when read in conjunction with the accompanying drawings in which.

DETAILED DESCRIPTION OF THE INVENTION

Figure 1:
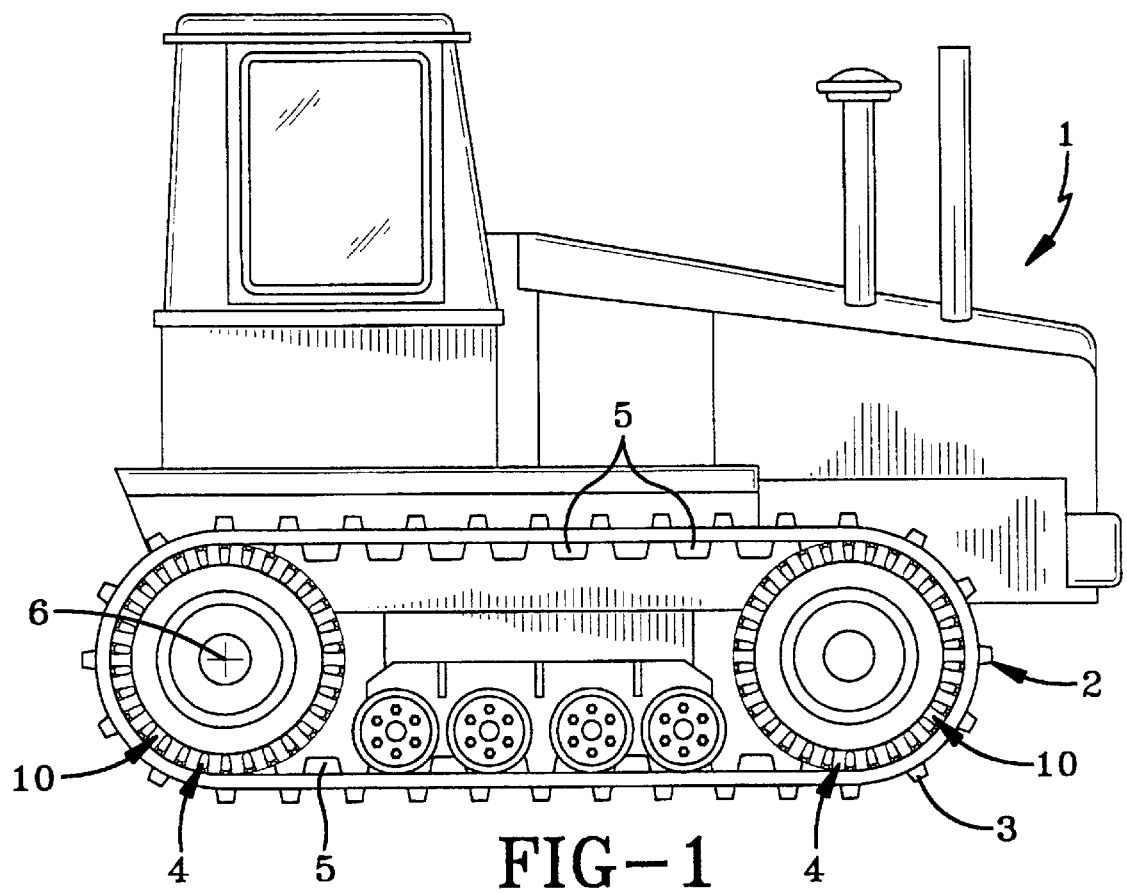
FIG. 1 is a side elevation view of the work vehicle (1).
Figure 2:
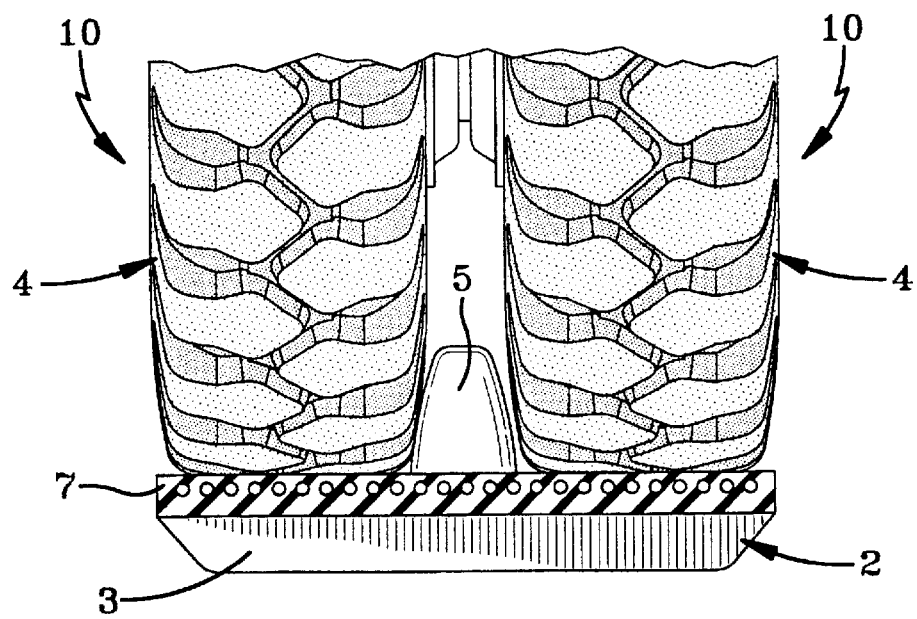
FIG. 2 is a partial cross-sectional view of a preferred drive wheel structure (4).

With reference to FIG. 1 a vehicle (1) is shown with its associated track (2) and drive wheel assembly (4). In the representative example the vehicle (1) has a forward and rear drive wheel position which is entrained by the track. Each drive wheel position has two wheels (4) as further illustrated in the cross-sectional view of FIG. 2. These tracks (2) have integral guide lugs (5) that are aligned in the circumferential direction and traverse between each pair of drive wheels (4). These guide lugs (5) prevent the track (2) from slipping over the ends of the wheels (4). Externally the track (2) has a rubberized tread (3) with cross bars or lugs (6) placed in a directional pattern as shown. No additional supporting structures or grossers are used in the application as shown. The pneumatic tires (10) provide the spring rate for the vehicle (1) and provide its cushioning such that the vehicle (1) can be provided without complex suspension system. The track (2) is reinforced by cords (7) running along a circumferential direction track (2). The wheel assembly (4) rides on each side of the guide lugs (5) along a smooth surface of the interior of the track.

Prior art pneumatic tires for this application were generally not preferred, however, when used the tires were of bias belted construction.

Figure 8:
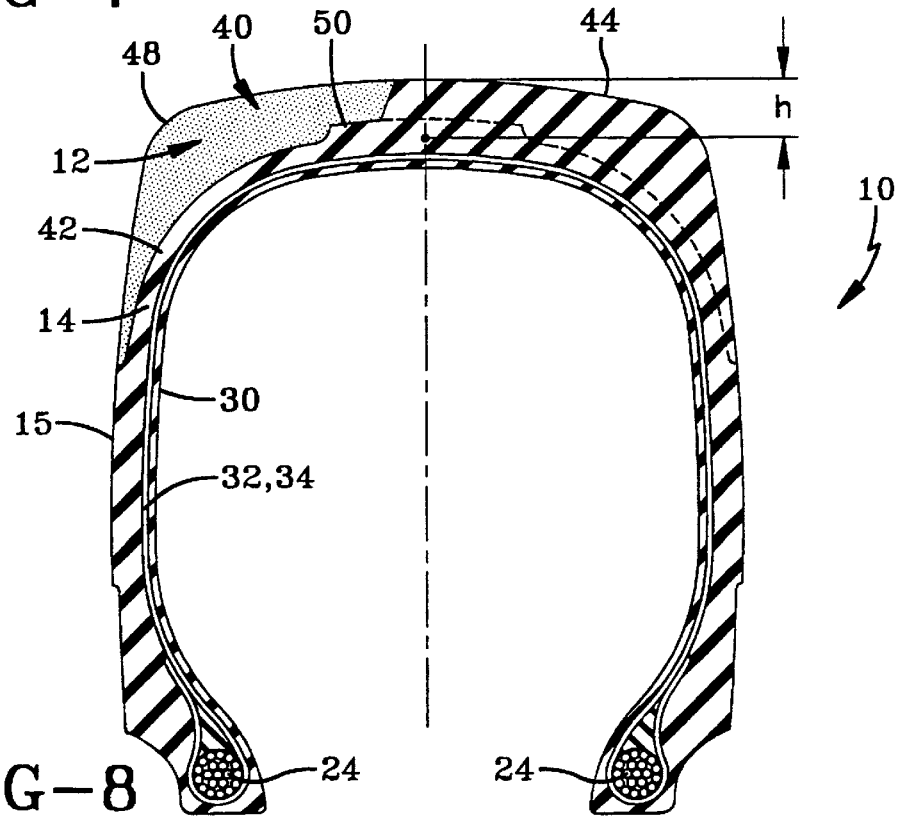
FIG. 8 is an enlarged cross-sectional view of the tire (10) taken along lines 8—8.

With reference to FIG. 8, a cross-sectional view of the tire (10) of the present invention is shown. The tire (10) has a pair of bead cores (24). The bead cores (24) are substantially inextensible for preferably made of steel. A carcass reinforcing structure (30) extends from bead core (24) to bead core (24) as shown. The carcass reinforcing structure (30) has two or more plies, a first ply (32) and a second ply (34). Each ply (32, 34) is reinforced with cords. The cords of the first ply (32) being equal but oppositely oriented relative to cords of the second ply (34). It is preferable that the cords are displaced in an angle of between 35 and 40°. Each ply structure (32, 34) as shown has a turns up which wraps about the bead core (24). Adjacent to the bead core (24) is a pair of sidewall structures (16). The sidewall structures (16) are generally elastomeric and extend from the beads (24) toward the tread (12). The tread (12) has a radially inner tread surface (14) and a plurality of tread lugs (40) extending from the radially inner tread surface (14) outwardly. The tread lugs (40) have an axially outer surface (42) and a radially outer surface (44). Disposed in this center portion of the tread (12) is shallow continuous rib (50).

Figure 7:
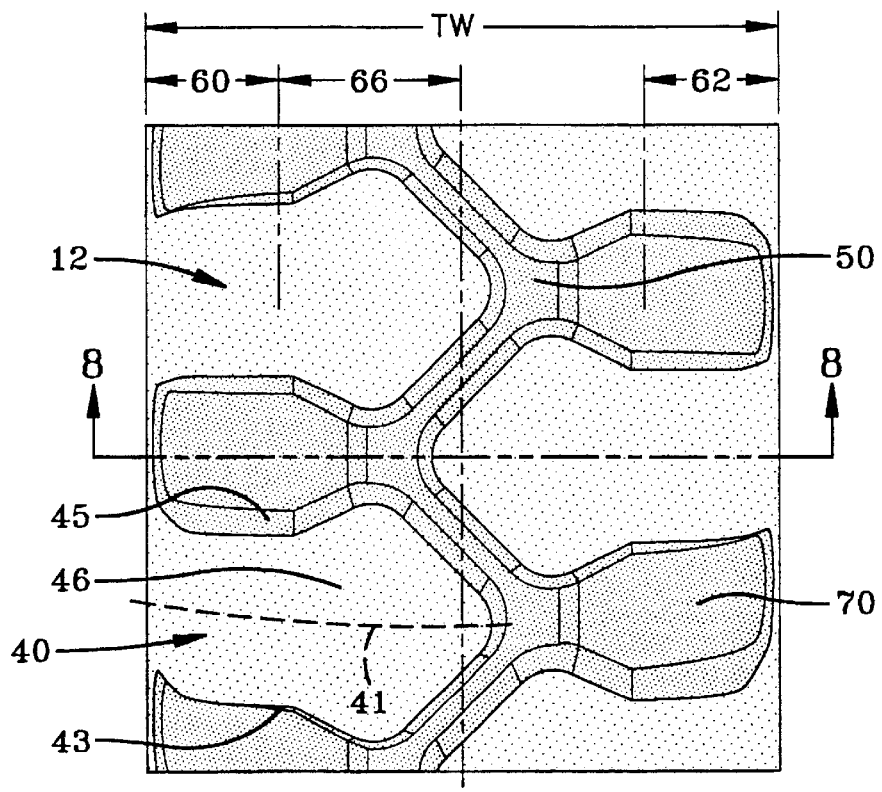
FIG. 7 is an enlarged plan view of the tread (12) of the tire (10) according to the present invention.

As shown in FIG. 7, the tread (12) is divided into axially outer portions (60) and (62) and a central portion (66). The outer portions are each ⅙ of the tread width whereas the central portion represents ⅔ of the tread width as illustrated. The axially outer portions (60, 62) have a net contact area as measured around the circumference of the tire (10) of approximately 52%. The central ⅔ portion of the tread as identified by reference numeral (66) has a contact area of substantially 60%. As shown the shallow rib (50) is occupied entirely within the central portion (66) of the tread (12). As further illustrated, the enlarged lug head (46) at the axially inner end of each lug (40) is located entirely within the central portion (66) of the tread (12). It is the central portion (66) which provides the primary driving and tractive force for the belt or track (2) and as such has the highest net contact area. As can be seen from FIG. 7, the void area between the lugs (40) extends from one tread edge to cross the tread (12) to the other tread edge creating an open soil discharge channel (70) completely across the tread. As further illustrated each tread lug (40) has a lug centerline (41) which lies substantially 90° to the circumferential direction of the tire (10). Each lug (40) as shown in FIG. 8 has a total depth of approximately h as measured at the equatorial plane. The lug height h includes the radial thickness of shallow rib (50) which extends above the inner surface (14) of the tread (12) distance of less than one half inch (2 cm). This shallow rib (50) provides additional bracing support for the lugs (40) and maintains the center of the tire (10) in a more rigid circumferential resistance to hoop deflection when employed with the circumferentially offset lugs (40) of the first and second rows.

Figure 3:
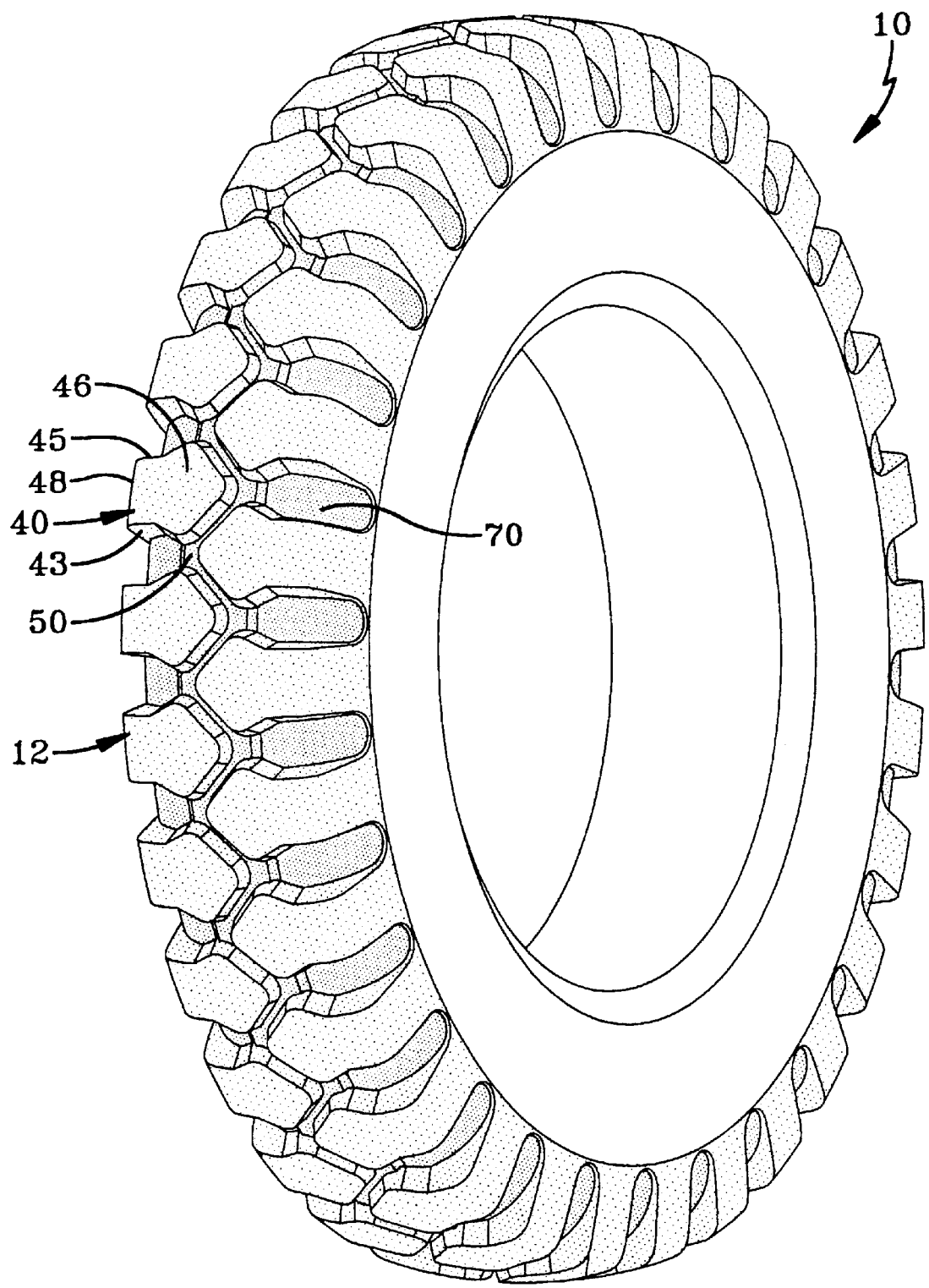
FIG. 3 is a perspective view of the drive tire (10) according to the invention.
Figure 4:
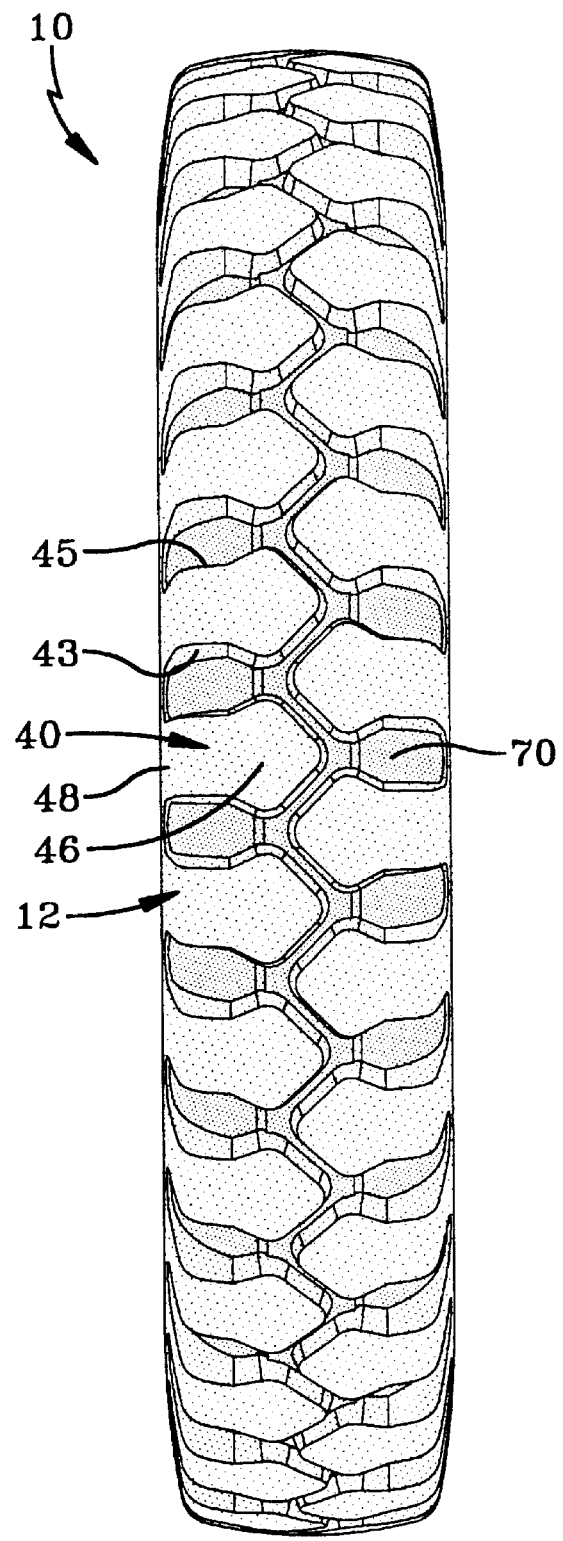
FIG. 4 is a plane view of the drive tire (10) of FIG. 3.

With reference to FIG. 3, a perspective view of the tire (10) is shown. The tread pattern is further shown in FIG. 4 in the plane view; it is important to note that the tires (10) are extremely small in section width in some cases having a total section width of less than 4 inches (16 cm). In one embodiment the tire (10) has a size 4.00-16sl and as aspect ratio of 101%. In a second embodiment tire (10), the tire (10) has a section width of 6 inches (24 cm) and a 16 inch (40 cm) nominal rim diameter and an aspect ratio of 103%. The tread width is naturally slightly smaller than the section width of the tire (10) which means that the entire tractive force of the drive tire must be achieved by the tread (12) over a very narrow width. In a preferred embodiment of the tire (10) the lug non-skid distance or lug height h is approximately 0.635 inches (1.6 cm). The lug measuring above the continuous rib (50) by 0.485 inches (1.2 cm) wherein the rib (50) itself had a depth of 0.15 inches (0.4 cm).

Figure 5:
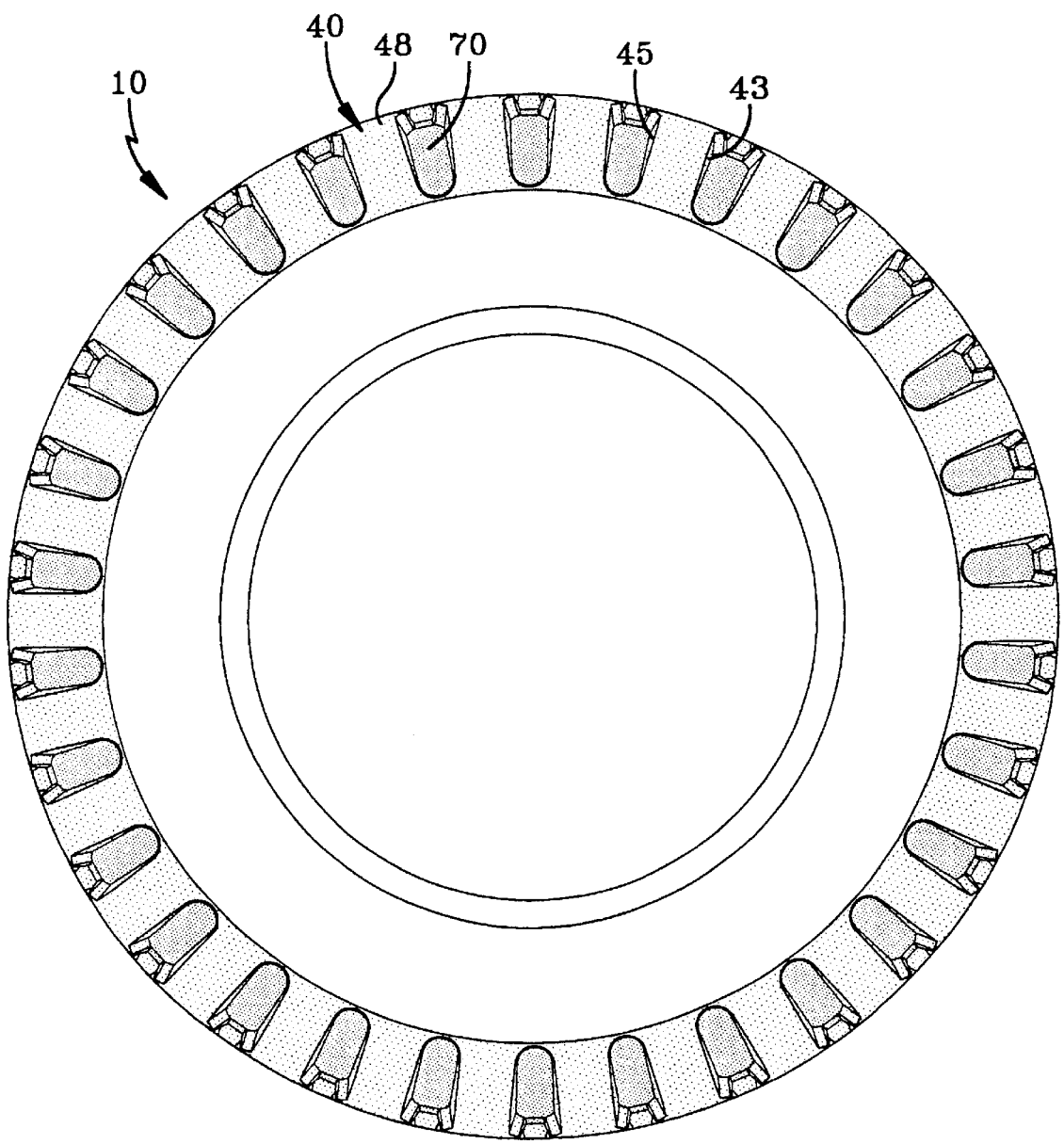
FIG. 5 is side view of the tire (10) of the present invention according to FIG. 3.

As shown in FIG. 5 a side view of the tire (10) it can be seen that the soil discharge channel (70) extends clearly down the sidewall (16) of the tire (10) a substantial distance and that the axially outer portion (42) of the tread lugs (40) similarly extend a reasonable distance down the sidewall of the tire (10).

Figure 6:
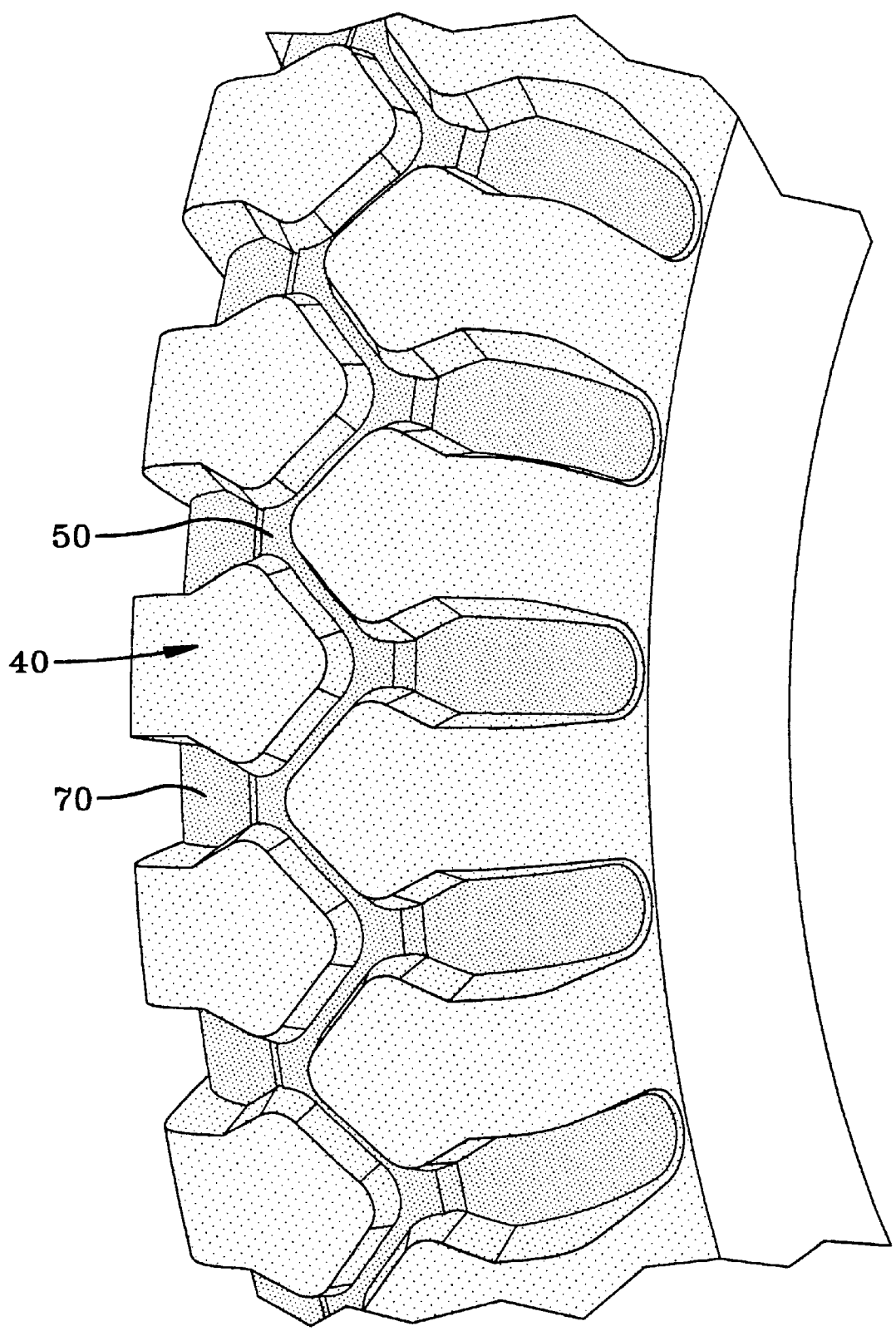
FIG. 6 is an enlarged fragmentary view of the tire (10) according to the present invention.

As further shown in FIG. 6 each lug (40) has a generous radius (48) joining the axially outer portion (42) of the lug (40) with the radially outer surface (44) of each lug (40). It is believed preferable that this radius (48) be less than the radius of track (2) to which the tire (10) is to be mounted. When this relationship is achieved the tire (10) is able to reasonably come in contact with the guide lug (5) at the radius of the guide lug (5) and the inner surface of the track (2) such that the tire sidewalls (16) generally are free of contact from the guide lugs (5) of the track (2) except under severe lateral loads. This prevents the tire (10) from wearing in the fashion that a V-belt would wear on a pulley. With this in mind, it is clear that the center portion (66) of the tread (12) must carry primary driving traction capability of the tire (10), therefore, a high contact area with sufficient grooving must be provided so that the tire (10) does not slip when internal surface of the track (2) and the tread (12) of the tire wheel assembly become lubricated with mud or wet sloppy soil. This is particularly apparent when the tires (10) are designed such that they have minimum tread width. While it believed that the tire (10) of the present invention requires no restrictive belts or breakers it is understood that they could be added if one so desired without losing the beneficial traction features of the tread (12) as described above. However it is believed that the belt or breakers are considered to be an unnecessary feature of the tire (10) when constructed in a bias carcass reinforcing structure as described above.

Interestingly, the tire (10) when manufactured as described above has a relatively low non-skid depth with a relatively high net contact area in the tread (12). The tire (10) being of relatively narrow section width and of sufficiently small diameter is extremely light weight in size and yet very durable for the application. The continuous channels (70) across the tread (12) provide excellent debris discharge capability and the fact that the lugs (40) of the first row are circumferentially offset from the lugs of the second row enable the tire (10) to maintain good uniform ride characteristics greatly reducing any vibration induced harmonics which further enhances the ride performance of the vehicle (1).

While it readily accepted that the rigid wheels are best suited for very heavy load applications it is further understood that the pneumatic tire (10) of the present invention provides an increase in surface traction to the belt or track (2) such that it is an acceptable alternative for medium to light weight vehicles which greatly reduces the overall cost of employ a tracked system.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic drive tire (10) for a tracked vehicle (1) having a pair of annular beads (24), a carcass reinforcing structure (34) extending radially outwardly from bead (24) to bead (24), an elastomeric sidewall (16) extending radially outwardly from each bead (22) adjacent the carcass reinforcing structure (30) to a radially outer tread (12), the tread (12) being characterized by, an inner tread (14);

a plurality of lugs (40) extending radially outwardly from the inner tread surface (14) a distance (h), the lugs (40) being divided into a first row and a second row, the first row extending from the sidewall (16) toward the center plane of the tread (12), the second row extending from the opposite sidewall (16) toward the center plane of the tread (12), the lugs (40) of the first row being circumferentially offset and similar in shape but oppositely oriented relative to the lugs (40) of the second row, each lug (40) having an enlarged axially inner end (46);

a shallow circumferentially continuous center rib (50) extending radially outwardly from the inner tread surface (14) a distance of less than half (h); and wherein the combination of lugs (40), inner tread surface (14) and a shallow central continuous rib (5) are spaced to create voids of continuous soil discharge channels (70) extending across the tread (12) from sidewall (16) to opposite sidewall (16).

2. The pneumatic drive tire (10) for a tracked vehicle (1) of claim 1 wherein the tread (12) is divided into three parts, a first outer portion (60) being ⅙ of the tread width, a second outer portion (62) being ⅙ of the tread width and a central portion (66) being ⅔ of the tread width, each portion (60, 62, 66) has a net contact area so measured around the circumference of the tire, the contact area of the first outer portion (60) and the second outer portion (62) is less than 60% of the gross circumferential area of the respective portion, the central portion (66) has a net contact area above 60%.

3. The pneumatic drive tire (10) for a tracked vehicle (1) of claim 1 further characterized by an aspect ratio of about 100%, the aspect ratio being defined as the tire section height divided by the tire section width.

4. The pneumatic drive tire (10) for a tracked vehicle (1) of claim 1 wherein each lug (40) has an axially outer surface (42) tangent to a sidewall (16) and extending generally radially outwardly therefrom to a radially outer surface (44), the radially outer surfaces (44) of circumferentially adjacent lugs (40) being spaced by the soil discharge channel (70).

5. The pneumatic drive tire (10) for a tracked vehicle (1) of claim 1 wherein the lug (40) extends radially from the central rib (50) a distance less than 0.5 inch (1.3 cm), the central rib extends outwardly less than 0.25 inch (0.6 cm), the total distance (h) being less than a 0.75 inches (1.9 cm).

6. The pneumatic drive tire (10) for a tracked vehicle (1) of claim 4 wherein each lug (40) has a radius portion (48) joining the radially outer surface (44) and the axially outer portion (42), the radius portion (48) being less then the radius of the central guide of the track (2) to which the tire (10) is driving, thereby minimizing the contact of the axially outer portion (42) of the lug (40) and the sidewall (16) with the track (2).

7. The pneumatic drive tire (10) for a tracked vehicle (1) of claim 1 wherein the lugs (40) each have a centerline (41) as measured between leading edges (43) and trailing edges (45) of the lug (40) the centerline (41) being about 90° relative to the circumferential direction of the tire.

* * * * *